US012672168B2

(12) United States Patent
Zheng et al.

(10) Patent No.: US 12,672,168 B2
(45) Date of Patent: Jun. 30, 2026

(54) WIRELESS COMMUNICATION METHOD, APPARATUS AND SYSTEM, AND DEVICE

(71) Applicant: TELINK SEMICONDUCTOR (SHANGHAI) CO., LTD., Shanghai (CN)

(72) Inventors: Mingjian Zheng, Shanghai (CN); Haipeng Jin, Shanghai (CN)

(73) Assignee: TELINK SEMICONDUCTOR (SHANGHAI) CO., LTD., Shanghai (CN)

( * ) Notice: Subject to any disclaimer, the term of this patent is extended or adjusted under 35 U.S.C. 154(b) by 644 days.

(21) Appl. No.: 17/975,335

(22) Filed: Oct. 27, 2022

(65) Prior Publication Data

US 2023/0389075 A1 Nov. 30, 2023

(30) Foreign Application Priority Data

May 24, 2022 (CN) .......................... 202210575385.9

(51) Int. Cl.
*H04W 74/08* (2024.01)
*H04W 74/0816* (2024.01)
(52) U.S. Cl.
CPC ... *H04W 74/0816* (2013.01); *H04W 74/0866* (2013.01)
(58) Field of Classification Search
CPC ... H04W 12/33; H04W 4/80; H04W 74/0816; H04W 74/0866; H04R 2420/07; H04R 5/033; G06F 2203/0384; G06F 3/0231
See application file for complete search history.

(56) References Cited

U.S. PATENT DOCUMENTS 10,700,765 B1 * 6/2020 Syed ........................ G06F 21/83
12,411,791 B2 * 9/2025 Zhao ........................ G06F 3/162
(Continued)

FOREIGN PATENT DOCUMENTS

CN 1862454 A 11/2006
CN 111385777 A 7/2020

OTHER PUBLICATIONS

Extended European Search Report mailed Jun. 9, 2023 in European Application No. 22201748.5, 6 pages.
(Continued)

*Primary Examiner* — Liton Miah
(74) *Attorney, Agent, or Firm* — Nixon & Vanderhye P.C.

(57) ABSTRACT

Provided is wireless communication method, apparatus and system, and a device. The method comprises receiving, by a wireless end device, first audio data transmitted by a wireless headset, in a first time slot through a first wireless communication channel therebetween; receiving task operation data input by each input device, in a corresponding time slot through a wireless communication channel therebetween, where the corresponding time slot is different from the first time slot; and executing at least one corresponding operation based on at least one of the first audio data and the task operation data. According to the present disclosure, various tasks including the game task are implemented in a wireless communication environment, and the first audio data and task operation data are received in different time slots during the execution of the tasks, such that the overall communication latency can be rather small.

8 Claims, 5 Drawing Sheets

(56)  References Cited

U.S. PATENT DOCUMENTS

| | | |
|---|---|---|
| 2008/0175207 A1 | 7/2008 | Lee et al. |
| 2014/0181337 A1* | 6/2014 | Zou .......................... G06F 13/10 |
| | | 710/63 |
| 2019/0223192 A1 | 7/2019 | Linsky |
| 2020/0100307 A1* | 3/2020 | Sridhara .............. H04B 17/318 |
| 2020/0374820 A1* | 11/2020 | Srivastava ............ H04L 5/0055 |
| 2021/0385575 A1 | 12/2021 | Meiyappan et al. |
| 2021/0397407 A1* | 12/2021 | Eubank ................... G06F 3/013 |

OTHER PUBLICATIONS

First Office Action mailed Jan. 17, 2025 in Chinese Application No. 202210575385.9, with English translation, 26 pages.

\* cited by examiner

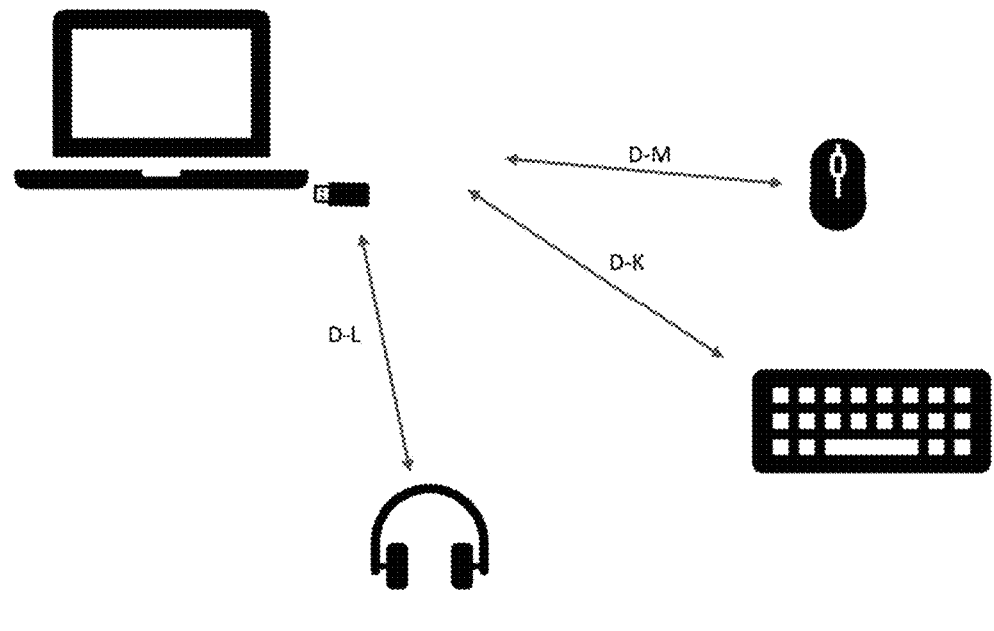

FIG. 2b

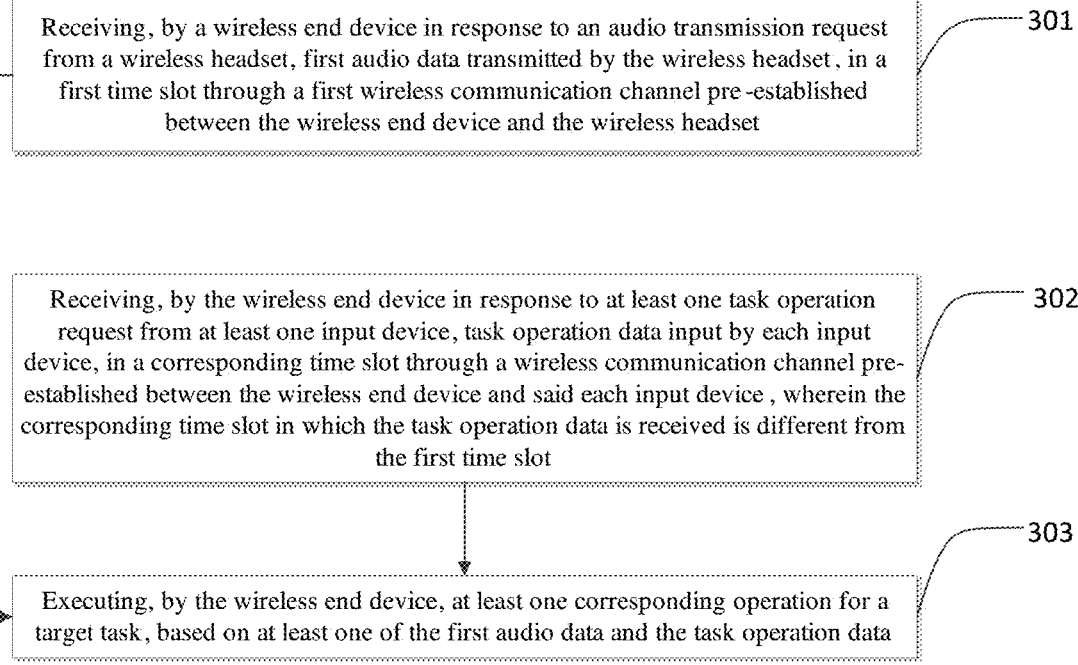

Receiving, by a wireless end device in response to an audio transmission request from a wireless headset, first audio data transmitted by the wireless headset, in a first time slot through a first wireless communication channel pre-established between the wireless end device and the wireless headset — 301

Receiving, by the wireless end device in response to at least one task operation request from at least one input device, task operation data input by each input device, in a corresponding time slot through a wireless communication channel pre-established between the wireless end device and said each input device, wherein the corresponding time slot in which the task operation data is received is different from the first time slot — 302

Executing, by the wireless end device, at least one corresponding operation for a target task, based on at least one of the first audio data and the task operation data — 303

FIG. 3

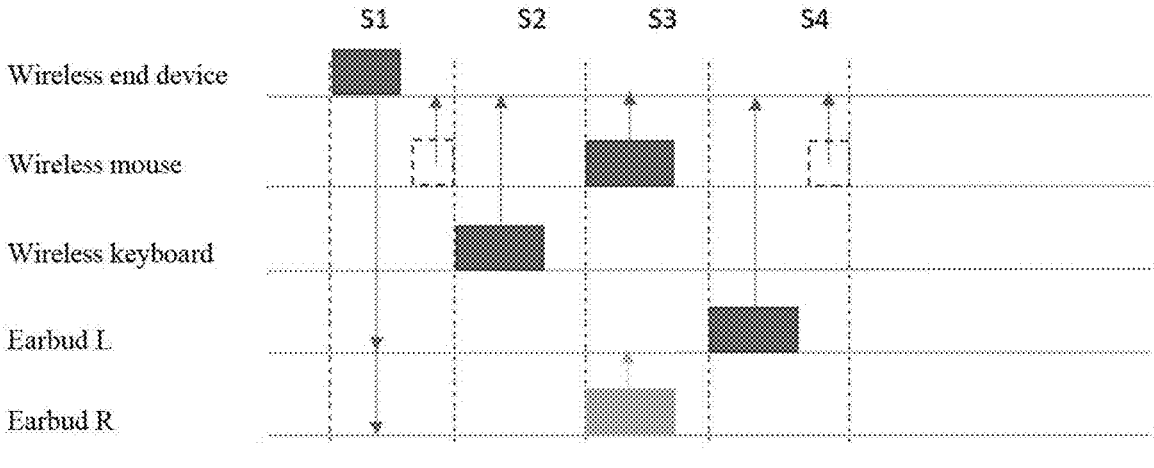
FIG. 7
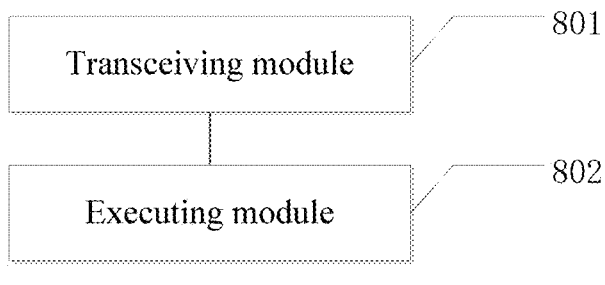
FIG. 8
FIG. 9

WIRELESS COMMUNICATION METHOD, APPARATUS AND SYSTEM, AND DEVICE

CROSS-REFERENCE TO RELATED PATENT APPLICATION

The present disclosure claims the benefit of and priority to Chinese Patent Application No. 202210575385.9 filed on May 24, 2022, the entire disclosure of which is incorporated by reference herein.

TECHNICAL FIELD

The present disclosure relates to the field of wireless communication technologies, in particular to a wireless communication method, apparatus and system, and a device.

BACKGROUND

With the development of wireless communication technologies and the widespread application of related Bluetooth products, Bluetooth wireless headsets have become a must-have to carry around. In order to facilitate the carrying and wearing, wireless headsets such as true wireless stereo (TWS) earbuds and wearable headsets are more and more widely used.

Taking the game scenario as an example, an immersive gaming experience can often be acquired in certain large-scale online games via a wireless headset. During the game, in addition to wearing the headset, input devices such as a keyboard and mouse are generally required to support the relevant game operations.

However, the access from the wireless keyboard and wireless mouse cannot meet the low latency requirement of the current game scenario.

SUMMARY

Embodiments of the present disclosure at least provide a wireless communication method, apparatus and system, and a device.

In a first aspect, embodiments of the present disclosure provide a wireless communication method, which includes:

receiving, by a wireless end device in response to an audio transmission request from a wireless headset, first audio data transmitted by the wireless headset, in a first time slot through a first wireless communication channel pre-established between the wireless end device and the wireless headset;

receiving, by the wireless end device in response to at least one task operation request from at least one input device, task operation data input by each input device, in a corresponding time slot through a wireless communication channel pre-established between the wireless end device and said each input device, where the corresponding time slot in which the task operation data is received is different from the first time slot; and executing, by the wireless end device, at least one corresponding operation for a target task, based on at least one of the first audio data and the task operation data.

According to a possible embodiment, the at least one input device includes a wireless keyboard and a wireless mouse, and receiving, by the wireless end device in response to at least one task operation request from at least one input device, the task operation data input by each input device, in the corresponding time slot through the wireless communication channel pre-established between the wireless end device and said each input device includes:

receiving, by the wireless end device in response to the task operation request from the wireless keyboard, the task operation data input by the wireless keyboard, in a second time slot through a second wireless communication channel pre-established between the wireless end device and the wireless keyboard, where the second time slot is different from the first time slot; and receiving, by the wireless end device in response to the task operation request from the wireless mouse, the task operation data input by the wireless mouse, in a third time slot through a third wireless communication channel pre-established between the wireless end device and the wireless mouse, where the third time slot is different from both the first time slot and the second time slot.

According to a possible embodiment, receiving, by the wireless end device in response to an audio transmission request from the wireless headset, the first audio data transmitted by the wireless headset in the first time slot includes:

receiving both the first audio data transmitted by the wireless headset and first control data for audio control of the wireless end device in the first time slot.

According to a possible embodiment, the method further includes:

acquiring, by the wireless end device, second audio data generated for the target task; and sending, by the wireless end device, the second audio data to the wireless headset in a fourth time slot through the first wireless communication channel, where the fourth time slot is different from both the first time slot and the corresponding time slot in which the task operation data is received.

According to a possible embodiment, sending, by the wireless end device, the second audio data to the wireless headset in the fourth time slot through the first wireless communication channel includes:

acquiring, by the wireless end device, second control data for audio control of the wireless headset; and sending, by the wireless end device, both the second audio data and the second control data to the wireless headset in the fourth time slot through the first wireless communication channel.

According to a possible embodiment, the wireless headset includes a true wireless stereo (TWS) headset, and sending, by the wireless end device, the second audio data to the wireless headset in the fourth time slot through the first wireless communication channel includes:

sending, by the wireless end device, the second audio data simultaneously to two earbuds of the TWS headset in the fourth time slot.

According to a possible embodiment, the two earbuds include a primary earbud, and receiving, by the wireless end device in response to the audio transmission request from the wireless headset, the first audio data transmitted by wireless headset in the first time slot further includes:

receiving, by the wireless end device, the first audio data transmitted by the primary earbud of the TWS headset in the first time slot.

According to a possible embodiment, the two earbuds include a primary earbud and a secondary earbud, and the method further includes:

receiving, by the primary earbud in response to a control request from the secondary earbud of the TWS headset, third control data sent by the secondary earbud, in a fifth time slot through a fourth wireless communication channel pre-established between the secondary earbud and the primary earbud, where the third control data is configured to control the primary earbud to execute a corresponding operation, and the fifth time slot is different from both the first time slot and the fourth time slot.

According to a possible embodiment, the fifth time slot is a same time slot as the corresponding time slot in which the task operation data is received, and the wireless communication channel through which the task operation data is received operates at a different radio frequency from the fourth wireless communication channel.

In a second aspect, embodiments of the present disclosure provide a wireless communication method, which includes:

acquiring, by a wireless headset, first audio data as collected currently; and sending, by the wireless headset, the first audio data to a wireless end device in a first time slot through a first wireless communication channel pre-established between the wireless end device and the wireless headset;

where the first audio data is configured to cause the wireless end device to execute a corresponding operation for a target task.

According to a possible embodiment, sending, by the wireless headset, the first audio data to the wireless end device in a first time slot through a first wireless communication channel pre-established between the wireless end device and the wireless headset includes:

sending, by the wireless headset, both the first audio data and first control data for audio control of the wireless end device to the wireless end device in the first time slot.

According to a possible embodiment, the method further includes:

receiving, by the wireless headset in response to an audio transmission request from the wireless end device, second audio data transmitted by the wireless end device, in a fourth time slot through the first wireless communication channel, where the fourth time slot is different from the first time slot.

According to a possible embodiment, receiving, by the wireless headset in response to an audio transmission request from the wireless end device, the second audio data transmitted by the wireless end device in the fourth time slot through the first wireless communication channel includes:

receiving, by the wireless headset from the wireless end device, both the second audio data and second control data for audio control of the wireless headset in the fourth time slot through the first wireless communication channel.

According to a possible embodiment, the wireless headset is a true wireless stereo (TWS) headset including a first earbud and a second earbud, and the method, after receiving, by the wireless headset in response to the audio transmission request from the wireless end device, the second audio data transmitted by the wireless end device in the fourth time slot through the first wireless communication channel, further includes:

performing, by the first earbud, a signal analysis on the second audio data to determine sub-audio data corresponding to the first earbud.

According to a possible embodiment, the first earbud is a primary earbud, and the method further includes:

receiving, by the first earbud in response to a control request from the second earbud of the TWS headset, third control data sent by the second earbud, in a fifth time slot through a fourth wireless communication channel pre-established between the second earbud and the first earbud, where the third control data is configured to control the first earbud to execute a corresponding operation, and the fifth time slot is different from both the first time slot and the fourth time slot.

According to a possible embodiment, sending, by the wireless headset, the first audio data to the wireless end device in the first time slot through a first wireless communication channel pre-established between the wireless end device and the wireless headset includes:

sending, by the first earbud in the first time slot, the first audio data to the wireless end device and fourth control data to the second earbud, where the fourth control data is configured to control the second earbud to execute a corresponding operation.

In a third aspect, embodiments of the present disclosure provide a wireless communication apparatus, which includes:

a transceiving module configured to: receive, in response to an audio transmission request from a wireless headset, first audio data transmitted by the wireless headset, in a first time slot through a first wireless communication channel pre-established between the wireless communication apparatus and the wireless headset; and receive, in response to at least one task operation request from at least one input device, task operation data input by each input device, in a corresponding time slot through a wireless communication channel pre-established between the wireless communication apparatus and said each input device, where the corresponding time slot in which the task operation data is received is different from the first time slot; and an executing module configured to execute at least one corresponding operation for a target task based on at least one of the first audio data and the task operation data.

In a fourth aspect, embodiments of the present disclosure further provide a wireless communication apparatus, which includes:

an acquiring module configured to acquire first audio data as collected currently; and a transceiving module configured to send the first audio data to a wireless end device in a first time slot through a first wireless communication channel pre-established between the wireless end device and the wireless communication apparatus, where the first audio data is configured to cause the wireless end device to execute a corresponding operation for a target task.

In a fifth aspect, embodiments of the present disclosure further provide a wireless communication system, comprising: a wireless end device, a wireless headset, and at least one input device, where the wireless headset and the at least one input device are in wireless communication with the wireless end device;

the wireless headset is configured to initiate an audio transmission request, and send first audio data to the wireless end device through a first wireless communication channel pre-established between the wireless end device and the wireless headset;

the at least one input device is configured to initiate a task operation request and send task operation data to the wireless end device through a second wireless communication channel pre-established between the wireless end device and each of the input devices; and the wireless end device is configured to execute at least one corresponding operation for a target task, based on at least one of the first audio data and the task operation data.

In a sixth aspect, embodiments of the present disclosure further provide an electronic device, which includes: a processor, a memory and a bus, where the memory has machine-readable instructions executable by the processor stored therein; the processor communicates with the memory via the bus when the electronic device is in operation; and the machine-readable instructions, when executed by the processor, cause the wireless communication method according to any one of the first aspect and its various embodiments, and the second aspect and its various embodiments to be performed.

In a seventh aspect, embodiments of the present disclosure further provide a computer-readable storage medium having computer programs stored thereon, where the computer programs, when executed by a processor, cause the wireless communication method according to any one of the first aspect and its various embodiments, and the second aspect and its various embodiments to be performed.

According to the wireless communication method, apparatus and system and the device, the first audio data transmitted by the wireless headset can be received, in response to the audio transmission request from the wireless headset, in a first time slot through a first wireless communication channel on one hand. On the other hand, in response to the task operation request from at least one input device, the task operation data input by the input device can be received in a corresponding time slot through the second wireless communication channel, such that the corresponding operations can be performed for the target task based on the first audio data and/or the task operation data. Various target tasks including the target game task can be realized in the wireless communication environment based on the mutual cooperation between the wireless end device, the wireless headset and the input device. In addition, the first audio data from the wireless headset and the task operation data from the input device can be received in different time slots during the execution of the target task, such that the overall communication latency is rather small, and applicability can be thereby improved.

Other advantages of the present disclosure will be explained in more detail in conjunction with the following description and accompanying drawings.

It should be noted that the aforesaid description is only an overview of the technical solutions of the present disclosure for facilitating better understanding of technical solutions of the present disclosure so as to enable implementation of the present disclosure in accordance with the content described in the specification. Detailed description of the present disclosure will be given below to make the above and other objects, features, and advantages of the present disclosure more apparent and comprehensible.

BRIEF DESCRIPTION OF THE DRAWINGS

For clearer descriptions of the technical solutions in the embodiments of the present disclosure, the following briefly introduces the accompanying drawings required for describing the embodiments. The drawings herein are incorporated in and constitute a part of the specification, and show embodiments consistent with the present disclosure and are used in conjunction with the specification to explain the technical solutions of the present disclosure. It shall be understood that the accompanying drawings below show merely some embodiments of the present disclosure and

Figure 1:
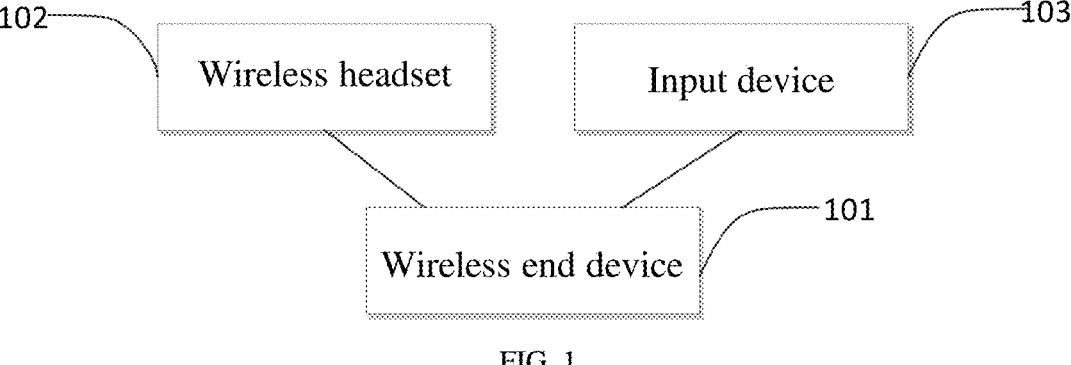
Figure 2A:
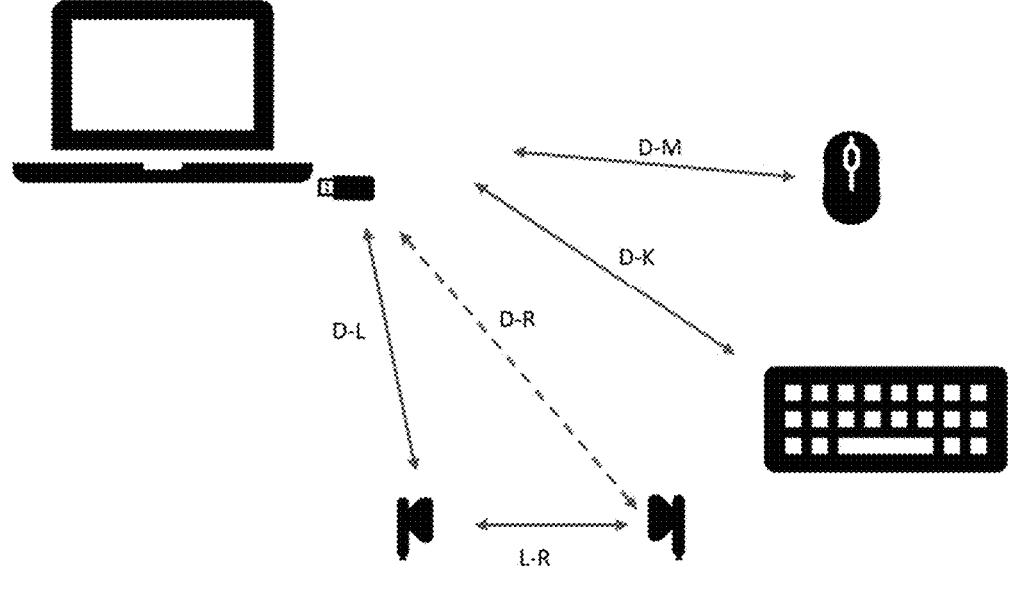
Figure 4:
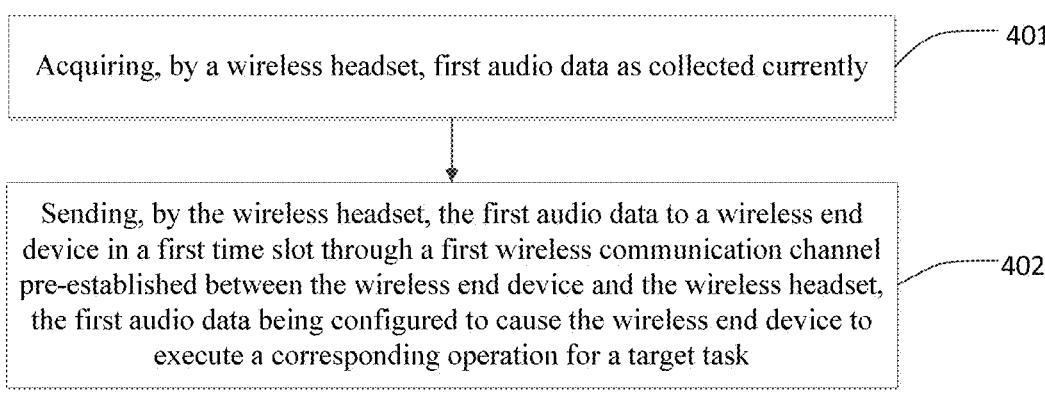
Figure 5:
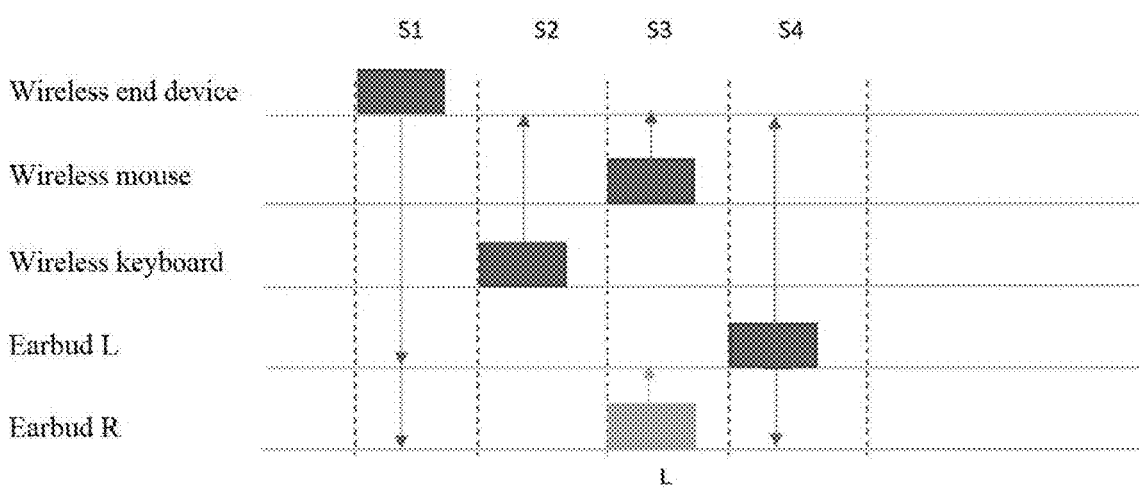
Figure 6:
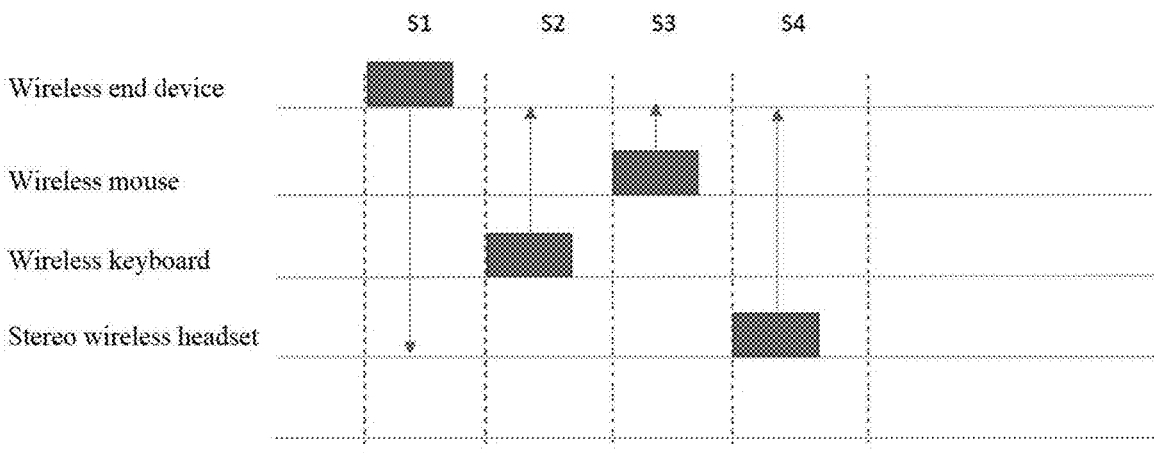
Figure 10:
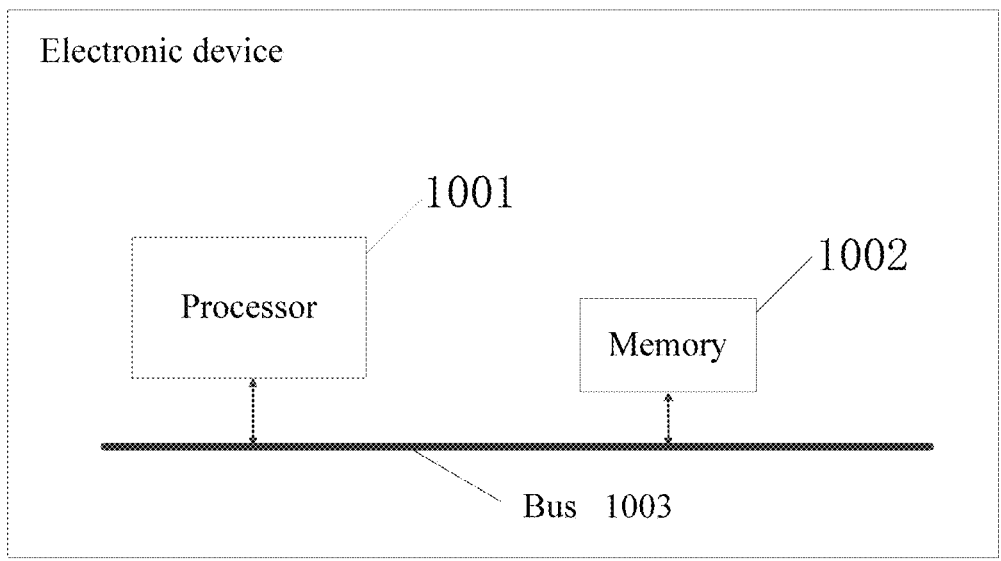

6 thereby cannot be deemed as a restriction to the scope, and a person of ordinary skill in the art may still derive other accompanying drawings from these accompanying drawings without creative efforts. Further, a same reference sign is adopted to indicate a same component throughout the accompanying drawings. In the accompanying drawings:

FIG. 1 is a schematic diagram of a wireless communication system according to an embodiment of the present disclosure;

FIG. 2a is a schematic diagram of a wireless communication system for a TWS headset according to an embodiment of the present disclosure;

FIG. 2b is a schematic diagram of a wireless communication system for a wearable wireless headset according to an embodiment of the present disclosure;

FIG. 3 is a flowchart of a wireless communication method according to an embodiment of the present disclosure;

FIG. 4 is a flowchart of another wireless communication method according to an embodiment of the present disclosure;

FIG. 5 is a time sequence diagram of communication for a TWS headset in a wireless communication method according to an embodiment of the present disclosure;

FIG. 6 is a time sequence diagram of communication for a wearable wireless headset in a wireless communication method according to an embodiment of the present disclosure;

FIG. 7 is another time sequence diagram of communication for a TWS headset in a wireless communication method according to an embodiment of the present disclosure;

FIG. 8 is a schematic diagram of a wireless communication apparatus according to an embodiment of the present disclosure;

FIG. 9 is a schematic diagram of another wireless communication apparatus according to an embodiment of the present disclosure; and FIG. 10 is a schematic structural diagram of an electric device according to an embodiment of the present disclosure.

DETAILED DESCRIPTION

Exemplary embodiments of the present disclosure will be described below in more detail with reference to the accompanying drawings. Although the accompanying drawings illustrate exemplary embodiments of the present disclosure, it should be understood that the present disclosure can be implemented in various forms and should not be construed as limited to embodiments described herein. Rather, these embodiments are provided so that the present disclosure will be understood thoroughly, and will fully convey the scope of the present disclosure to those skilled in the art.

In description of embodiments of the present disclosure, it should be understood that terms such as "include" or "have" are intended to indicate the existence of the characteristics, digits, steps, actions, components, parts disclosed by the specification or any combination thereof, without excluding the existence of one or more other characteristics, digits, steps, actions, components, parts or any combination thereof.

Unless otherwise specified, "/" refers to "or"; for example, A/B may indicate A or B. In this specification, the term "and/or" merely describes the association relationship between the associated objects and indicates that there may be three relationships. For example, A and/or B may indicate three cases where only A exists, both A and B exist, and only B exists.

In addition, the terms such as "first" and "second" are merely for a descriptive purpose, and cannot be understood as indicating or implying a relative importance, or implicitly indicating the number of the indicated technical features. Hence, the features defined by "first" and "second" can explicitly or implicitly include one or more features. In the description of embodiments of the present disclosure, "a plurality of" means two or more in number, unless otherwise specified.

In order to illustrate the embodiments of the present disclosure clearly, some terms that may appear in subsequent embodiments will be introduced first.

The wireless end device may be a personal computer or a game platform, and may for example include a desktop computer, a laptop, various game devices, and the like.

The wireless headset may refer to a headset that transmits audio data via wireless signals and may have a Bluetooth function, such as a true wireless stereo (TWS) headset, a wearable stereo wireless headset, and the like.

The input device may refer to a device for inputting data and information to the computer, such as a keyboard, mouse, camera, scanner, optical pen, handwriting input board, joystick, voice input device, and the like.

The time slot may refer to a certain unit of time as defined in the general digital communication principle.

As found by research, under a game scenario, an immersive gaming experience can often be acquired in certain large-scale online games via the wireless headset. During the game, in addition to wearing the headset, input devices such as a keyboard and mouse are generally required to support the related game operations.

However, the access from the wireless keyboard and wireless mouse cannot meet the low latency requirement of the current game scenario.

As mentioned above, the traditional solution cannot meet the low latency requirement of certain scenarios, which brings inconvenience to various application scenarios including the game scenario.

In order to address, at least in part, the aforesaid problem and one or more of other potential problems, embodiments of the present disclosure provide at least one wireless communication solution. In this solution, various target tasks including the target game task can be realized in the wireless communication environment based on the mutual cooperation between the wireless end device, the wireless headset and the input device. In addition, the first audio data from the wireless headset and the task operation data from the input device can be received in different (i.e., separate) time slots during the execution of the target task, such that the overall communication latency is rather small, and applicability can be thereby improved.

The present disclosure will be described in detail below with reference to the accompanying drawings and embodiments.

To facilitate understanding of this embodiment, a wireless communication system according to embodiments of the present disclosure will be introduced first. As shown in FIG. 1, the wireless communication system according to embodiments of the present disclosure mainly includes a wireless end device 101, a wireless headset 102, and at least one input device 103. The wireless headset 102 and the at least one input device 103 are in wireless communication with the wireless end device 101.

The wireless headset 102 is configured to initiate an audio transmission request, and send first audio data to the wireless end device 101 through a first wireless communication channel pre-established between the wireless end device 101 and the wireless headset 102.

Each input device 103 is configured to initiate a task operation request and send task operation data to the wireless end device 101 through a wireless communication channel pre-established between the wireless end device 101 and said each input devices 103.

The wireless end device 101 is configured to execute at least one corresponding operation for a target task based on at least one of the first audio data and the task operation data.

In the wireless communication system according to embodiments of the present disclosure, an audio transmission request may be initiated at the wireless headset 102 to send the first audio data to the wireless end device 101 through the first wireless communication channel pre-established between the wireless end device 101 and the wireless headset 102. Furthermore, a task operation request may be initiated at the input device 103 to send the task operation data to the wireless end device 101 through a wireless communication channel pre-established between the wireless end device 101 and the input devices 103. As a result, the wireless end device 101 may be able to execute at least one corresponding operation for the target task based on the first audio data and/or the task operation data as received.

As well known, various target tasks including the target game task can be realized in the wireless communication environment based on the mutual cooperation between the wireless end device 101, the wireless headset 102 and the input device 103. In addition, the first audio data from the wireless headset 102 and the task operation data from the input device 103 can be received in different time slots during the execution of the target task, such that the overall communication latency is rather small, and applicability can be thereby improved.

Considering that the wireless end device 101 often needs to be connected to large devices such as personal computers, gaming devices in particular scenario applications, the wireless end device 101 may therefore be connected to the large devices by relevant universal serial bus (USB) components. The communication between the wireless end device 101 and the wireless headset 102 is established relying on the relevant communication protocol, and under the guidance of the communication protocol, the audio transmission request from the wireless headset 102 may be responded with the first wireless communication channel as pre-established. In addition, the communication between the wireless end device 101 and the input device 103 is also established relying on the relevant communication protocol, and under the guidance of the communication protocol, the task operation request from the input device 103 may be responded with the wireless communication channel as pre-established. As a result, the wireless end device 101 may parse the first audio data and task operation data as received to adapt to the target task, thereby realizing the relevant operation for the target task.

To make it easier to understand the relevant operations here, the target game task will be taken as an example of the target task below for illustration. For the user of the wireless end device 101, in the case of receiving the task operation data sent from the input device 103 such as the wireless keyboard for the target game task, a jumping action of the target object may be displayed instantly at the wireless end device 101 if the task operation data for example is configured to control the target object in the target game task to jump. In the case of receiving the first audio data from the wireless headset 102 for the target game task, a voice message may be delivered to other game members via the wireless end device 101 if the first audio data for example refers to the voice message corresponding to other game members, thereby facilitating the team game combat.

In addition, the task operation data and the first audio data are received in different time slots, which may further reduce the communication latency while avoiding signal interference, and thereby well meet the application scenarios such as large-scale online games having a high latency requirement, and give a good gaming experience.

It should be noted that the wireless end device 101 may be connected to a personal computer, a laptop, or other mobile devices that support USB communication, which is not specifically limited here.

The wireless headset 102 here may be various Bluetooth headsets including a TWS headset and a wearable wireless headset 102, and in practical applications, it can not only send the first audio data to the wireless end device 101, but also receive the second audio data generated by the wireless end device 101 for the target task.

Alternatively, the input device 103 herein may be various wireless input devices 103 including a wireless keyboard, a wireless mouse, and the like. There may be one input device 103 in embodiments of the present disclosure. For example, in a case where only one input device 103 such as a wireless keyboard is connected, a second wireless communication channel may be established correspondingly. There may also be a plurality of input devices 103. For example, in a case where two input devices 103 such as a wireless keyboard and a wireless mouse are connected, the wireless communication channel shall be correspondingly established for each of the input devices 103; and two wireless communication channels need to be established in total, i.e., the second wireless communication channel between the wireless keyboard and the wireless end device 101 and the third wireless communication channel between the wireless mouse and the wireless end device 101.

Different wireless headsets may include different components. Thus, the specific wireless communication process may be implemented in different ways. In order to facilitate further understanding of the wireless communication system according to the embodiments of the present disclosure, the TWS headset and the wearable wireless headset will be taken as examples of the wireless headsets for illustration.

FIG. 2a is a schematic diagram of a wireless communication system consisting of a TWS headset, a wireless keyboard and wireless mouse (corresponding to input devices), and a corresponding wireless end device (connected to a personal computer via USB) comprising a USB interface. The TWS headset consists of a left earbud (corresponding to L) and a right earbud (corresponding to R), and the two earbuds (i.e., left and right earbuds) are in communication via a wireless channel.

In the process of implementing the wireless communication, the earbud L may perform wireless communication with a USB wireless end device and the earbud R (as shown by D-L and L-R in the figure) respectively; and the earbud R may perform wireless communication with the USB wireless end device and the earbud L (as shown by D-R and L-R in the figure) respectively. In addition, the wireless keyboard may be in wireless communication with the USB wireless end device (as shown by D-K in the figure), and the wireless mouse is also in wireless communication with the USB wireless end device (as shown by D-M in the figure).

Based on this, the wireless end device may transmit the first audio data to other clients corresponding to the target task in the case of receiving the first audio data from the two earbuds, thereby achieving the conversation between the plurality of clients. Other audio data is also possible, which is not limited specifically here. In addition, the wireless end device may directly perform the operation in response to the target task in the case of receiving the task operation data from the wireless keyboard or wireless mouse, thereby facilitating the low latency task operation in the wireless network environment, and achieving a wider adaptability.

FIG. 2b is a schematic diagram of a wireless communication system consisting of a wearable wireless headset, a wireless keyboard and wireless mouse (corresponding to input devices), and a corresponding wireless end device (connected to a personal computer via USB) comprising a USB interface. In the process of the wireless communication, the wireless end device may implement the task operation based on the first audio data received via the wireless communication channel D-L and the task operation data received via the D-K and/or D-M.

Since the wireless end device plays a key role in the wireless communication system according to embodiments of the present disclosure, a wireless communication method taking the wireless end device as an execution subject will be firstly described below. The wireless end device here mainly refers to a device for wireless communication with a wireless headset, at least one input device, and the like, and may for example be a USB component or a related electronic device with a USB component. In some possible embodiments, the wireless communication method described above may be implemented by the processor that calls computer-readable instructions as stored in the memory.

Referring to FIG. 3 showing a flowchart of a wireless communication method according to an embodiment of the present disclosure, the method includes steps S301 to S303.

S301: in response to an audio transmission request from a wireless headset, a wireless end device receives first audio data transmitted by the wireless headset, in a first time slot through a first wireless communication channel pre-established between the wireless end device and the wireless headset.

S302: in response to at least one task operation request from at least one input device, the wireless end device receives task operation data input by each input device, in a corresponding time slot through a wireless communication channel pre-established between the wireless end device and said each input device, where the corresponding time slot in which the task operation data is received is different from the first time slot.

S303: the wireless end device performs at least one corresponding operation for a target task, based on at least one of the first audio data and the task operation data.

In order to facilitate further understanding of the wireless communication method according to embodiments of the present disclosure, the application scenario of the method will be briefly illustrated first. The wireless communication method according to embodiments of the present disclosure may be mainly applied in the field of games or other various application scenarios that require simultaneous communication of multiple wireless devices, which is not specifically limited here. Considering the wide application in the field of games, the application scenario in the field of games will be taken as a primary example below for illustration.

The audio transmission request here may be initiated when the wireless headset acquires the user audio data (i.e., the first audio data). Under this case, the wireless headset may send the first audio data through the first wireless communication channel pre-established between the wireless headset and the wireless end device, and the wireless end device may receive the relevant first audio data in a corresponding first time slot. The task operation request may be initiated while executing operations related to clicking, touching and the like on the input device. For example, the task operation request may be initiated by the click operation of the wireless mouse in the case where the cursor of the wireless mouse is running to the target position; under this case, the input device may send task operation data through the wireless communication channel pre-established between the input device and the wireless end device, and the wireless end device may receive the relevant task operation data in the corresponding time slot.

In practical gaming application scenarios, the input device according to embodiments of the present disclosure may include a wireless keyboard and a wireless mouse. In response to the task operation request from the wireless keyboard, the task operation data input by the wireless keyboard may be received by the wireless end device in the second time slot through the second wireless communication channel pre-established between the wireless end device and the wireless keyboard, where the second time slot is different from the first time slot. That is, the wireless communication between the wireless end device and the wireless keyboard can be realized in embodiments of the present disclosure through the second wireless communication channel. Similarly, in response to the task operation request from the wireless mouse, the task operation data input by the wireless mouse may be received by the wireless end device in the third time slot through the third wireless communication channel pre-established between the wireless end device and the wireless mouse, where the third time slot is different from both the first time slot and the second time slot. That is, the wireless communication between the wireless end device and the wireless mouse can be realized in embodiments of the present disclosure through the third wireless communication channel.

In embodiments of the present disclosure, the first wireless communication channel, the second wireless communication channel and the third wireless communication channel can all be established with the help of USB components. For the relevant description, reference may be made to the contents about the wireless communication system, which will not be repeated here. The first time slot, the second time slot and the third time slot are all different time slots from each other, and they may also have different time slot lengths. For example, the second time slot or the third time slot is mainly for implementing the data transmission, and may be fixed to a specific time slot length or set adaptively. For example, the time slot length may be long if the transmission amount of data is great, and may be short if the transmission amount of data is small.

It should be noted that, in addition to the wireless keyboard and wireless mouse, other input devices may be provided in embodiments of the present disclosure, and a joystick may for example be provided. Similarly, the time slot for receiving the task data shall also be configured for the joystick, which is not repeated here. Considering that the cooperation between the wireless keyboard and the wireless mouse is widely applied in gaming application scenarios, the wireless keyboard and wireless mouse will be taken as examples of the input devices below for illustration.

As well known, the first audio data and the task operation data are received in different time slots. Thus, there is no signal interference, which ensures the quality of the signal transmission and meanwhile allows a certain amount of time for the analysis of the wireless headset, especially for the sorting of the left and right earbuds and the like as included in the working process of the TWS headset, thereby facilitating the operations of the wireless headset.

In the case of receiving the first audio data and the task operation data, a corresponding operation may be performed for the target task based on the first audio data, or may be performed for the target task based on the task operation data. For example, the first audio data may be parsed here to obtain an audio interaction signal for the target task, such that an interaction operation may be performed for the target task based on the audio interaction signal. The interaction operation may be a team combat operation in a game scenario. For another example, the task operation data may be parsed to determine an action execution instruction for the target object in the target task, such that the corresponding action may be executed on the target object based on the action execution instruction. The action as executed here may control the target object in the game scene to perform the corresponding action.

In addition, other operations may be performed for the target task in embodiments of the present disclosure based on the aforesaid two data, and the operations as performed may vary for different application scenarios, which is not specifically limited here.

The wireless headset in the wireless communication method according to embodiments of the present disclosure may transmit the first audio data as acquired to the wireless end device, and may further perform audio control of the wireless end device, which may be implemented here by generating and sending first control data for audio control of the wireless end device to the wireless end device. As a result, the wireless end device may perform a corresponding operation based on the first control data as received. The operation may include a control operation to the wireless end device during the data transmission, and may for example be an operation of adjusting the transmission frequency for sending the data.

The first control data may be generated based on the communication status information between the wireless end device and the wireless headset, and the transmission frequency may for example be amplified if the wireless communication status between the wireless end device and the wireless headset is poor.

In practical applications, the first control data here may be sent along with the first audio data mentioned above, such that the wireless end device can receive both the first audio data and the first control data in the first time slot, thereby further reducing the communication delay.

The first wireless communication channel according to embodiments of the present disclosure may be a two-way communication channel that supports not only the reception of the first audio data and the first control data at the wireless end device, but also the sending of the second audio data generated for the target task to the wireless headset.

In embodiments of the present disclosure, the second audio data may be sent to the wireless headset in the fourth time slot through the first wireless communication channel. The target game task is also taken as an example of the target task here, and the second audio data may refer to the background audio data during the game. The second audio data may be transmitted to the wireless headset in a low-latency way, such that the user can have an immersive gaming experience via the wireless headset.

The aforesaid fourth time slot is different from the first time slot, the second time slot and the third time slot. In practical applications, the second time slot and the third time slot here may be arranged one after another, and the specific sequence is not specifically limited. For example, the second time slot may be earlier than the third time slot. The first time slot here may be later than the second time slot or the third time slot. For example, in an embodiment where the second time slot is earlier than the third time slot, the first time slot may be later than the third time slot. The process of sending the first audio data and/or the first control data from the wireless headset to the wireless end device may refer to the communication data between the two earbuds included in the wireless headset, in particular the TWS headset; whereas the data communication between the two earbuds may be accompanied by the generation of a time slot for sending the operation data of the input device. Thus, the first time slot is arranged to be later than the second time slot or the third time slot.

The sequence between the fourth time slot and the first time slot, the second time slot and the third time slot may be dynamically adjusted, and they may for example be arranged in a sequence of fourth time slot, second time slot, third time slot and first time slot. The time slot lengths of the four time slots may be non-fixed, and the sum of the four time slot lengths may be in the range of 1 ms to 1.25 ms.

The wireless end device in the wireless communication method according to embodiments of the present disclosure may also perform audio control of the wireless headset in addition to transmitting the first audio data as acquired to the wireless end device, and the audio control may be implemented here by generating and sending second control data for audio control of the wireless headset to the wireless headset. Accordingly, the wireless headset may perform a corresponding operation based on the second control data as received and may for example adjust the headset volume. The second control data here is similar to the first control data, and may also be determined based on the communication status information between the wireless end device and the wireless headset, which will not be repeated here.

In practical applications, the second control data here may be sent along with the second audio data mentioned above, such that the wireless headset can receive both the second audio data and the second control data in the fourth time slot, thereby further reducing the communication delay.

For different wireless headsets, the wireless end device may have different wireless communication methods, and the wireless communication method for the TWS headset and the wearable stereo wireless headset will be illustrated below.

The TWS headset includes two earbuds (i.e., the left earbud and the right earbud). In this case, the wireless end device may send the second audio data simultaneously to two earbuds of the TWS headset in the fourth time slot, such that the two earbuds may complete the reception task by respectively picking the corresponding sub-audio data from the second audio data.

In the wireless communication method according to embodiments of the present disclosure, the relevant first audio data may be sent to the wireless end device by the primary earbud of the two earbuds. That is, the primary earbud not only plays the role of data receiving but also plays the role of data sending. In practical applications, the primary earbud is generally the left earbud, whereas in some special cases, the right earbud may also serve as the primary earbud.

In practical applications, the primary earbud here can also be controlled by the secondary earbud to achieve the inter-earbud control. That is, in response to a control request from the secondary earbud of the TWS headset, the primary earbud may receive third control data sent by the secondary earbud, in the fifth time slot through the fourth wireless communication channel pre-established between the secondary earbud and the primary earbud, the third control data being configured to control the primary earbud to perform a corresponding operation.

In order to further reduce the communication latency, the fifth time slot here may be different from both the first time slot and the fourth time slot, and may be the same time slot as the second time slot, or may be the same time slot as the third time slot. That is, the communication between the earbuds may be implemented in the same time slot as the communication between the input device and the wireless end device. For example, the wireless end device may receive the task operation data input by the wireless mouse in the same time slot as the one in which the primary earbud receives the third control data sent by the primary earbud.

Meanwhile, during the process of transmitting the task operation data and the third control data, the communication may be performed at different wireless frequencies, which significantly reduces the communication latency while ensuring data transmission without interference, and thereby provides a higher applicability.

For the wearable stereo wireless headset, the two earbuds on both sides of the wearable stereo wireless headset may be directly connected via wired lines. In practical applications, the communication process of the wearable stereo wireless headset may be understood as a simplified version of communication of the TWS headset, where the wearable stereo wireless headset may serve as an earbud to achieve the communication with the wireless end device. For the specific data transmission process, reference may be made to the aforesaid description, which will not be repeated here.

Since the wireless headset plays a key role in the wireless communication system according to embodiments of the present disclosure, a wireless communication method taking the wireless headset as the execution subject will be mainly described below. The wireless headset mainly refers to the headset having a Bluetooth function, which may for example include a TWS headset, a wearable wireless headset, and the like. In addition, some of the wireless communication is based on Bluetooth, whereas the other part of the wireless communication is based on a non-Bluetooth manner. In some possible embodiments, the wireless communication method described above may be implemented by the processor that calls computer-readable instructions as stored in the memory.

It should be noted that, besides the wireless headset, other electronic devices with certain computing power and audio playback capability are also available in the actual implementation of the wireless communication method described above. Due to the wide application, the wireless headset will be taken as an example below for illustration.

Referring to FIG. 4 showing a flowchart of a wireless communication method according to an embodiment of the present disclosure, the method includes steps S401 to S402.

S401: a wireless headset acquires first audio data as collected currently.

S402: the wireless headset sends the first audio data to a wireless end device in a first time slot through a first wireless communication channel pre-established between the wireless end device and the wireless headset, the first audio data being configured to cause the wireless end device to execute a corresponding operation for a target task.

After acquiring the first audio data, the wireless headset here may send the first audio data to the wireless end device in a first time slot through the first wireless communication channel.

The first audio data may be the user audio data, and for the details, reference may be made to the aforesaid description, which will not be repeated here. In addition, the audio interaction can be implemented while executing the corresponding operation on the target task with the first audio data, which will not be repeated here.

In practical application, as to the reception at the wireless end device, both the first audio data and the first control data for audio control of the wireless end device may be sent to the wireless end device in the first time slot. For the details, reference may be made to the aforesaid description, which will not be repeated here.

In addition, corresponding to the sending at the wireless end device, the second audio data transmitted by the wireless device may be received, in response to the audio transmission request from the wireless device, in the fourth time slot through the first wireless communication channel. Meanwhile, the second control data for controlling the wireless headset may be also received in the fourth time slot through the first wireless communication channel. For the details, reference may be made to the aforesaid description, which will not be repeated here.

For different wireless headsets, the corresponding wireless communication methods as implemented may be slightly different. Thus, the wireless communication for the TWS headset and the wearable stereo wireless headset may be detailed below with following two aspects.

In a first aspect, the wireless communication method may be implemented by separately acting on each earbud of the TWS headset, such as the left earbud of the TWS headset or the right earbud of the TWS headset. The two earbuds of the TWS headsets may work simultaneously but perform different headset functions. For example, as the primary earbud, the left earbud further needs to upload the user audio data collected per se in addition to executing the basic data communication and transmission.

In embodiments of the present disclosure, both earbuds can perform the signal analysis to sort out the sub-audio data. Taking the first earbud as an example, the signal analysis is performed on the second audio data to determine the sub-audio data corresponding to the first earbud. The first earbud herein may be the left earbud of the TWS headset, and the second earbud namely corresponds to the right earbud of the TWS headset. In addition, the first earbud herein may also be the right earbud of the TWS headset, and the second earbud namely corresponds to the left earbud of the TWS headset, which is not specifically limited here.

No matter the first earbud is the left earbud or the right earbud, the first earbud and the second earbud work independently. In the case where the second audio data is received, the signal analysis may be performed to determine the first sub-audio data corresponding to the first earbud and the second sub-audio data corresponding to the second earbud, such that the audio can be played in the corresponding sound channel.

In embodiments of the present disclosure, the two earbuds may be controlled by each other. For example, in the case where the first earbud serves as the primary earbud, it may be controlled by the second earbud according to the following steps.

Step 1: In response to a control request from the second earbud of the TWS headset, the third control data sent by the second earbud is received by the first earbud in a fifth time slot through a fourth wireless communication channel preestablished between the second earbud and the first earbud, the fifth time slot being different from both the first time slot and the fourth time slot.

Step 2: The first earbud is controlled to perform the corresponding operation according to the third control data.

Due to the fourth wireless communication channel as pre-established between the second earbud and the first earbud, in the case that the second earbud initiates a control request, the first earbud may receive the third control data in the fifth time slot to respond to the control request from the second earbud, and then perform the corresponding operation. The operation herein may include the control operation of the two earbuds during the data transmission, and may for example include the operation of turning up the receiving volume of the first earbud or adjusting the receiving frequency at which the data is received.

The fourth wireless communication channel here may be a channel implemented based on the Bluetooth, and may in practical applications be constructed based on the Bluetooth communication protocol between the Bluetooth function modules contained in each of the two earbuds (first earbud and second earbud). The fifth time slot is different from both the first and fourth time slots, which can reduce the transmission latency as much as possible while ensuring the high quality data transmission.

The fifth time slot may be a same time slot as the second time slot in which the task operation data is transmitted between the wireless keyboard and the wireless end device, or may be the same time slot as the third time slot in which the task operation data is transmitted between the wireless mouse and the wireless end device. That is, the communication between the two earbuds and the communication between the input device and the wireless end device may be implemented in the same time slot, such that the communication latency can be further reduced.

It should be noted that the fourth wireless communication channel for achieving the communication between the two earbuds may correspond to a different transceiving frequency from the second wireless communication channel or the third wireless communication channel for achieving the communication between the input device and the wireless end device, such that the data transmission can be performed without interference under a low latency.

In the wireless communication method according to embodiments of the present disclosure, fourth control data may be further sent to the second earbud in the first time slot in addition to sending the first audio data to the wireless end device, so as to further reduce the communication latency. The fourth control data here is configured to control the second earbud to perform the corresponding operation. That is, in the case where the first earbud serves as the primary earbud, the first earbud may further control the secondary earbud in addition to undertaking the task of sending the first audio data to the wireless end device, such that the earbud can be controlled targetedly with the minimized communication latency. For example, the subsequent playback volume may be adjusted.

To get a further understanding, the wireless communication process for the TWS headset will be illustrated in conjunction with the time sequence diagram shown in FIG. 5.

In the time slot as shown in FIG. 5, one time sequence cycle may include 4 time slots, which are S1, S2, S3 and S4 respectively. It is not necessary to configure S1 to S4 to have a same length, and S1 to S4 may form a cycle of 1 ms or 1.25 ms, and each cycle can repeat the same pattern.

S1 and S4 are time slots for achieving the wireless communication between the wireless headset and the wireless end device; and L2 is a time slot for achieving the wireless communication between the two earbuds. S2 corresponds to the wireless communication between the wireless keyboard and the wireless end device, and S3 corresponds to the two types of wireless communication between the wireless mouse and the wireless end device, and between the two earbuds.

In an embodiment, in the time slot S1, the wireless end device may send stereo audio to the earbud L and the earbud R in a single packet, with the earbud L and earbud R selecting their data, respectively; in the time slot S2, the wireless keyboard sends data to the wireless end device; in the time slot S3, the wireless mouse sends data to the wireless end device; in the time slot S2, data of the wireless keyboard is transmitted over the second wireless communication channel; in the time slot S3, data of the wireless mouse is transmitted over the third wireless communication channel, and meanwhile, the earbud R may send control data to a fourth wireless communication channel having a different transceiving frequency from the third wireless communication channel and then transmit the data to the earbud L; and in the time slot S4, the earbud L may send audio (e.g., microphone) and control data to the wireless end device, and also send control data to the earbud R.

During the overall communication process, the wireless end device may implement the operations for the target task based on the audio data and task operation data as received, which are not specifically repeated here.

In a second aspect, the wireless communication method may also be implemented by acting on the stereo wireless headset. The earpieces on both sides of the stereo wireless headset are directly connected by wired line.

For the stereo wireless headset, the wireless communication method according to embodiments of the present disclosure may be performed by firstly generating first control data for controlling the wireless end device to transmit data based on the communication status information between the stereo wireless headset and the wireless end device. Then, the first control data is sent to the wireless end device through the first wireless communication channel.

For details about the first control data, reference may be made to the aforesaid description, which will not be repeated here.

It shall be noted that, in practical applications, the communication process of the stereo wireless headset may be understood as a simplified version of communication of the TWS headset, where the stereo wireless headset may serve as an earbud to achieve the communication with the wireless end device. For the specific data transmission process, reference may be made to the aforesaid description, which will not be repeated here.

To get a further understanding, the wireless communication process for the stereo wireless headset will be illustrated in conjunction with the time sequence diagram shown in FIG. 6.

In the time slot shown in FIG. 6, the working principle of the time slots is similar to that of the TWS headset, except for the time slots corresponding to S1/S2.

In an embodiment, in the time slot S1, the wireless end device may send stereo audio to the wireless headset in a single packet; in the time slot S2, the wireless keyboard sends data to the wireless end device in correspondence to a second wireless communication channel; in the time slot S3, the wireless mouse sends data to the wireless end device in correspondence to a third wireless communication channel; and in the time slot S4, the wireless headset may send audio (e.g., microphone) and control data to the wireless end device.

During the overall communication process, the wireless end device may implement the operations for the target task based on the audio data and task operation data as received, which are not specifically repeated here.

It should be noted that in a case where the wireless mouse serve as an input device, embodiments of the present disclosure further provide a method for creating additional transmission opportunities without changing the total cycle of S1 to S4 especially in large online gaming scenarios, so as to maximize the mouse reporting rate. The time sequence diagram shown in FIG. 5 is taken as an example here for illustration.

The transmission time slot length in S1 and/or S4 may be reduced for example by reducing the sample rate of the audio data or by increasing the compression rate of the audio data.

In practical applications, the wireless mouse may monitor the audio transmission in S1 or S4 and therefore know when the audio transmission is ready to end. In this case, the wireless mouse may send additional data to the wireless end device based on the remaining time of S1 or S4 as shown in FIG. 7, which can significantly improve the mouse reporting rate and thus further enhance the gaming experience.

In the description of this specification, the description with reference to terms such as "some possible embodiment", "some embodiments", "examples", "specific examples", or "some examples", and the like indicates that the specific feature, structure, material or characteristic described in conjunction with the embodiment or example is included in at least one embodiment or example of the present invention. In this specification, the schematic representations of the aforesaid terms do not necessarily for the same embodiment or example. Moreover, the specific features, structures, materials or characteristics as described may be combined in any one or more embodiments or examples in a suitable manner. In addition, those skilled in the art may combine and group the different embodiments or examples and the features of the different embodiments or examples described in this specification without contradicting each other.

With respect to the flowchart of the method according to embodiments of the present disclosure, certain operations are depicted as different steps performed in a certain sequence, and such a flowchart is illustrative rather than restrictive. Some of the steps described herein may be grouped together and performed in a single operation, some steps may be split into a plurality of sub-steps, and some steps may be performed in an order different from that shown herein. All the steps shown in the flowchart may be implemented in any manner by any circuit structure and/or tangible mechanism (e.g., by software running on a computer device, hardware such as logic functions implemented by a processor, chip and the like, and/or any combination thereof).

It will be understood by those skilled in the art that, in the method according to an embodiment, the sequence of the steps as presented does not imply a strict executing sequence and thereby does not constitute a restriction to the implementing process, and the specific executing sequence of the steps shall be determined by their function and possible internal logic.

Based on the same inventive concept, the wireless communication apparatus corresponding to the wireless communication method is also provided in embodiments of the present disclosure. Since the principle of the device for solving the problem in embodiments of the present disclosure is similar to that of the wireless communication method described above, for the implementation of the device, reference may be made to the implementation of the method, which will not be repeated here.

Referring to FIG. 8 that is a schematic diagram of a wireless communication apparatus according to an embodiment of the present disclosure, the apparatus includes a transceiving module and an executing module 802.

The transceiving module 801 is configured to receive, in response to an audio transmission request from a wireless headset, first audio data transmitted by the wireless headset, in a first time slot through a first wireless communication channel pre-established between the wireless communication apparatus and the wireless headset, and also receive, in response to at least one task operation request from at least one input device, task operation data input by each input device, in a corresponding time slot through a wireless communication channel pre-established between the wireless communication apparatus and said each input device. The corresponding time slot in which the task operation data is received is different from the first time slot.

The executing module 802 is configured to execute at least one corresponding operation for a target task, based on at least one of the first audio data and the task operation data.

According to the wireless communication apparatus, the first audio data transmitted by the wireless headset can be received, in response to the audio transmission request from the wireless headset, in a first time slot through a first wireless communication channel on one hand. On the other hand, in response to the task operation request from at least one input device, the task operation data input by the input device can be received in a corresponding time slot through the corresponding wireless communication channel, and the corresponding operations can be thereby performed for the target task based on the first audio data and/or the task operation data. Various target tasks including the target game task can be realized in the wireless communication environment based on the mutual cooperation between the wireless end device, the wireless headset and the input device. In addition, the first audio data from the wireless headset and the task operation data from the input device can be received in different time slots during the execution of the target task, such that the overall communication latency is rather small, and applicability can be thereby improved.

According to a possible embodiment, the at least one input device includes a wireless keyboard and a wireless mouse, the transceiving module 801 is configured to receive the task operation data input by each input device, in the corresponding time slot through the wireless communication channel pre-established between the wireless communication apparatus and said each input device specifically by following steps of:

receiving, in response to the task operation request from the wireless keyboard, the task operation data input by the wireless keyboard, in a second time slot through a second wireless communication channel pre-established between the wireless communication apparatus and the wireless keyboard, the second time slot being different from the first time slot; and receiving, in response to the task operation request from the wireless mouse, the task operation data input by the wireless mouse, in a third time slot through a third wireless communication channel pre-established between the wireless communication apparatus and the wireless mouse, the third time slot being different from both the first time slot and the second time slot.

According to a possible embodiment, the transceiving module 801 is configured to receive, in response to the audio transmission request from the wireless headset, the first audio data transmitted by the wireless headset in the first time slot by a following step of:

receiving both the first audio data transmitted by the wireless headset and first control data for audio control of the wireless communication apparatus in the first time slot.

According to a possible embodiment, the transceiving module 801 is further configured to:

acquire second audio data generated for the target task; and send the second audio data to the wireless headset in a fourth time slot through the first wireless communication channel, the fourth time slot being different from both the first time slot and the corresponding time slot in which the task operation data is received.

According to a possible embodiment, the transceiving module 801 is configured to send the second audio data to the wireless headset in the fourth time slot by following steps of:

acquiring second control data for audio control of the wireless headset; and sending both the second audio data and the second control data to the wireless headset in the fourth time slot through the first wireless communication channel.

According to a possible embodiment, the wireless headset includes a TWS headset, and the transceiving module 801 is configured to send the second audio data to the wireless headset in the fourth time slot by a following step of:

sending the second audio data simultaneously to two earbuds of the TWS headset in the fourth time slot.

According to a possible embodiment, the two earbuds include a primary earbud, and the transceiving module 801 is configured to receive the first audio data transmitted by the wireless headset in the first time slot by a following step of:

receiving the first audio data transmitted by the primary earbud of the TWS headset in the first time slot.

According to a possible embodiment, the two earbuds include a primary earbud and a secondary earbud, and the apparatus further includes:

a control module configured to control the primary earbud to receive, in response to a control request from the secondary earbud of the TWS headset, third control data sent by the secondary earbud, in a fifth time slot through a fourth wireless communication channel pre-established between the secondary earbud and the primary earbud, the third control data being configured to control the primary earbud to execute a corresponding operation, and the fifth time slot being different from both the first time slot and the fourth time slot.

According to a possible embodiment, the fifth time slot is a same time slot as the corresponding time slot in which the task operation data is received, and the wireless communication channel through which the task operation data is received operates at a different radio frequency from the fourth wireless communication channel.

Referring to FIG. 9 that is a schematic diagram of another wireless communication apparatus according to an embodiment of the present disclosure, the apparatus includes an acquiring module 901 and a transceiving module 902.

The acquiring module 901 is configured to acquire first audio data as collected currently.

The transceiving module 902 is configured to send the first audio data to a wireless end device in a first time slot through a first wireless communication channel pre-established between the wireless end device and the wireless communication apparatus, where the first audio data is configured to cause the wireless end device to execute a corresponding operation for a target task.

According to a possible embodiment, the transceiving module 902 is configured to send the first audio data to the wireless end device in the first time slot by a following step of:

sending both the first audio data and first control data for audio control of the wireless end device to the wireless end device in the first time slot.

According to a possible embodiment, the transceiving module 902 is further configured to:

receive, in response to an audio transmission request from the wireless end device, second audio data transmitted by the wireless end device, in a fourth time slot through the first wireless communication channel, the fourth time slot being different from the first time slot.

According to a possible embodiment, the transceiving module 902 is configured to receive the second audio data transmitted by the wireless end device in the fourth time slot by a following step of:

receiving, from the wireless end device, both the second audio data and second control data for audio control of the wireless communication apparatus, in the fourth time slot through the first wireless communication channel.

According to a possible embodiment, the wireless communication apparatus is a first earbud of a TWS headset including the first earbud and a second earbud, and the apparatus further includes:

an analyzing module 903 configured to perform a signal analysis on the second audio data after receiving the second audio data in the fourth time slot, and thereby determine second sub-audio data corresponding to the second earbud.

According to a possible embodiment, the first earbud is a primary earbud, and the transceiving module 902 is further configured to:

receive, in response to a control request from the second earbud of the TWS headset, third control data sent by the second earbud, in a fifth time slot through a fourth wireless communication channel pre-established between the second earbud and the first earbud. The third control data herein is configured to control the first earbud to execute a corresponding operation, and the fifth time slot is different from both the first time slot and the fourth time slot.

According to a possible embodiment, the transceiving module 902 is further configured to send fourth control data to the second earbud in the first time slot, the fourth control data being configured to control the second earbud to execute a corresponding operation.

It should be noted that the apparatus according to embodiments of the present disclosure may implement various processes of the method as described above and can achieve the same effect and function, which will not be repeated here.

Embodiments of the present disclosure further provide an electronic device, and FIG. 10 is a schematic structural diagram of the electronic device according to embodiments of the present disclosure, which includes a processor 1001, a memory 1002, and a bus 1003. The memory 1002 has machine-readable instructions executable by the processor 1001 (e.g., executable instructions corresponding to the transceiving module 801, executing module 802 in the apparatus shown in FIG. 8, or the executable instructions corresponding to the acquiring module 901 and transceiving module 902 in the apparatus shown in FIG. 9) stored therein.

When the electronic device is in operation, the processor 1001 communicates with the memory 1002 via the bus 1003, and the machine-readable instructions, when executed by the processor 1001, cause steps of the wireless communication method as shown in FIG. 3 or FIG. 4 to be performed.

Embodiments of the present disclosure further provide a computer-readable storage medium having computer programs stored thereon. The computer programs, when executed by a processor, cause the wireless communication method according to the aforesaid method embodiments to be performed. The storage medium may be a volatile or non-volatile computer readable storage medium.

Embodiments of the present disclosure further provide a computer program product for carrying program code. The program code include instructions that can be adopted to execute the wireless communication method according to the aforesaid method embodiments. For the details, reference may be made to the aforesaid method embodiments, which will not be repeated herein.

The computer program product may be embodied specifically by means of hardware, software, or a combination thereof. In an optional embodiment, the computer program product is specifically embodied as a computer storage medium, and in another optional embodiment, the computer program product is specifically embodied as a software product, such as a software development kit (SDK), and the like.

The respective embodiments of the present disclosure are described in a progressive manner. The reference may be made to each other for the same or similar parts of the respective embodiments, and each embodiment focuses on the differences from other embodiments. Especially, for the embodiments of the apparatus, device and computer-readable storage medium, since they basically correspond to the embodiments of the method, they are described in a simple way, and reference may be made to the description part on embodiments of the method for relevant points.

The apparatus, device and computer-readable storage medium according to embodiments of the present disclosure correspond to the method one by one. Thus, the apparatus, device and computer-readable medium have similar beneficial technical effects with the corresponding method. Since the beneficial technical effects of the method have been described in detail above, the beneficial technical effects of the apparatus, device and computer-readable storage medium will not be repeated here.

One skilled in the art should understand that, the embodiments of the present disclosure may be provided as a method, apparatus (device or system) and computer-readable storage medium. Therefore, the present disclosure may be in the form of full hardware embodiments, full software embodiments, or a combination thereof. Moreover, the present disclosure may be in the form of a computer-readable storage medium that is implemented on one or more computer-usable storage media (including, without limitation, magnetic disk storage, CD-ROM and optical storage) containing computer-usable program codes.

The present disclosure is described referring to the flowchart and/or block diagram of the method, apparatus (device or system) and computer-readable storage medium according to the embodiments of the present disclosure. It should be understood that, each flow and/or block in the flowchart and/or block diagram and the combination of flow and/or block in the flowchart and/or block diagram may be realized via computer program instructions. Such computer program instructions may be provided to the processor of a general-purpose computer, special-purpose computer, a built-in processor or other programmable data processing devices to produce a machine, such that the instructions executed by the processor of a computer or other programmable data processing devices may produce a device for realizing the functions specified in one or more flows in the flowchart and/or one or more blocks in the block diagram.

Such computer program instructions may also be stored in a computer-readable storage that can guide a computer or other programmable data processing devices to work in a specific mode, such that the instructions stored in the computer-readable storage may produce a manufacture comprising a commander device, where the commander device may realize the functions specified in one or more flows of the flowchart and one or more blocks in the block diagram.

Such computer program instructions may also be loaded to a computer or other programmable data processing devices, such that a series of operational processes may be executed on the computer or other programmable devices to produce a computer-realized processing, and thereby the instructions executed on the computer or other programmable devices may provide a process for realizing the functions specified in one or more flows in the flowchart and/or one or more blocks in the block diagram.

In a typical configuration, the computing device includes one or more processors (CPU), an input/output interface, a network interface, and a memory.

The memory may include a non-permanent memory in a computer-readable medium, a random access memory (RAM) and/or a non-volatile memory, such as a read-only memory (ROM) or a flash memory (flash RAM). The memory is an example of a computer-readable medium.

The computer-readable medium may be permanent and non-permanent, or removable and non-removable media, which can achieve the information storage by any method or technology. The information may be computer-readable instructions, data structures, program modules, or other data. Examples of the computer storage medium include, but are not limited to, a phase change memory (PRAM), a static random access memory (SRAM), a dynamic random access memory (DRAM), other types of random access memory (RAM), read-only memory (ROM), an electrically erasable programmable read-only memory (EEPROM), a flash memory or other memory technologies, a CD-ROM, a digital versatile disc (DVD) or other optical storage, and a magnetic cassette tape. The magnetic tape storage or other magnetic storage devices or any other non-transmission medium may be used to store information that can be accessed by computing devices. Furthermore, although the operations of the method of the present disclosure are described in a specific order in drawings, it does not require or imply that the operations must be performed in the specific order, or that the desired result can only be achieved if all the operations as shown are performed. Additionally or alternatively, some steps may be omitted, multiple steps may be combined into one step for execution, and/or one step may be decomposed into multiple steps for execution.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the scope of the appended claims.

What is claimed is:

1. A method of wireless communication, comprising:
receiving, by a wireless end device in response to an audio transmission request from a wireless headset, first audio data transmitted by the wireless headset, in a first time slot within each time sequence cycle through a first wireless communication channel pre-established between the wireless end device and the wireless headset;
receiving, by the wireless end device in response to at least one task operation request from at least one input device, task operation data input by each input device, in a corresponding time slot within said each time sequence cycle through a wireless communication channel pre-established between the wireless end device and said each input device, wherein the corresponding time slot in which the task operation data is received is different from the first time slot; and
executing, by the wireless end device, at least one corresponding operation for a target task, based on at least one of the first audio data and the task operation data,
wherein the at least one input device comprises a wireless keyboard and a wireless mouse, and wherein the receiving by the wireless end device in response to at least one task operation request comprises:
receiving, by the wireless end device in response to the task operation request from the wireless keyboard, the task operation data input by the wireless keyboard, in a second time slot through a second wireless communication channel pre-established between the wireless end device and the wireless keyboard, wherein the second time slot is different from the first time slot; and
receiving, by the wireless end device in response to the task operation request from the wireless mouse, the task operation data input by the wireless mouse, in a third time slot through a third wireless communication channel pre-established between the wireless end device and the wireless mouse, wherein the third time slot is different from both the first time slot and the second time slot,
wherein the method further comprises receiving, by the wireless end device, additional task operation data from the wireless mouse in a remaining duration of the first time slot after completion of reception of the first audio data in the first time slot.

2. The method according to claim 1, wherein receiving, by the wireless end device in response to an audio transmission request from the wireless headset, the first audio data transmitted by the wireless headset, in the first time slot within each time sequence cycle comprises:
receiving both the first audio data transmitted by the wireless headset and first control data for audio control of the wireless end device in the first time slot.

3. The method according to claim 1, further comprising:
acquiring, by the wireless end device, second audio data generated for the target task; and
sending, by the wireless end device, the second audio data to the wireless headset in a fourth time slot through the first wireless communication channel, wherein the fourth time slot is different from both the first time slot and the corresponding time slot in which the task operation data is received.

4. The method according to claim 3, wherein sending, by the wireless end device, the second audio data to the wireless headset in the fourth time slot through the first wireless communication channel comprises:

acquiring, by the wireless end device, second control data for audio control of the wireless headset; and sending, by the wireless end device, both the second audio data and the second control data to the wireless headset in the fourth time slot through the first wireless communication channel.

5. The method according to claim 3, wherein the wireless headset comprises a true wireless stereo (TWS) headset, and sending, by the wireless end device, the second audio data to the wireless headset in the fourth time slot through the first wireless communication channel comprises:

sending, by the wireless end device, the second audio data simultaneously to two earbuds of the TWS headset in the fourth time slot.

6. The method according to claim 5, wherein the two earbuds comprise a primary earbud, and receiving, by the wireless end device in response to the audio transmission request from the wireless headset, the first audio data transmitted by the wireless headset in the first time slot further comprises:

receiving, by the wireless end device, the first audio data transmitted by the primary earbud of the TWS headset in the first time slot.

7. A wireless communication apparatus, comprising:

a transceiving module configured to: receive, in response to an audio transmission request from a wireless headset, first audio data transmitted by the wireless headset, in a first time slot within each time sequence cycle through a first wireless communication channel pre-established between the wireless communication apparatus and the wireless headset; and receive, in response to at least one task operation request from at least one input device, task operation data input by each input device, in a corresponding time slot within said each time sequence cycle through a wireless communication channel pre-established between the wireless communication apparatus and said each input device, wherein the corresponding time slot in which the task operation data is received is different from the first time slot; and an executing module configured to execute at least one corresponding operation for a target task, based on at least one of the first audio data and the task operation data, wherein the at least one input device comprises a wireless keyboard and a wireless mouse, and wherein the transceiving module is configured to:

receive, in response to the task operation request from the wireless keyboard, the task operation data input by the wireless keyboard, in a second time slot through a second wireless communication channel pre-established between the wireless communication apparatus and the wireless keyboard, wherein the second time slot is different from the first time slot; and receive, in response to the task operation request from the wireless mouse, the task operation data input by the wireless mouse, in a third time slot through a third wireless communication channel pre-established between the wireless communication apparatus and the wireless mouse, wherein the third time slot is different from both the first time slot and the second time slot, wherein the transceiving module is configured to: further receive additional task operation data from the wireless mouse in a remaining duration of the first time slot after completion of reception of the first audio data in the first time slot.

8. A wireless communication system, comprising a wireless end device, a wireless headset, and at least one input device, wherein the wireless end device is a wireless communication apparatus according to claim 7.

* * * * *